UNITED STATES PATENT OFFICE.

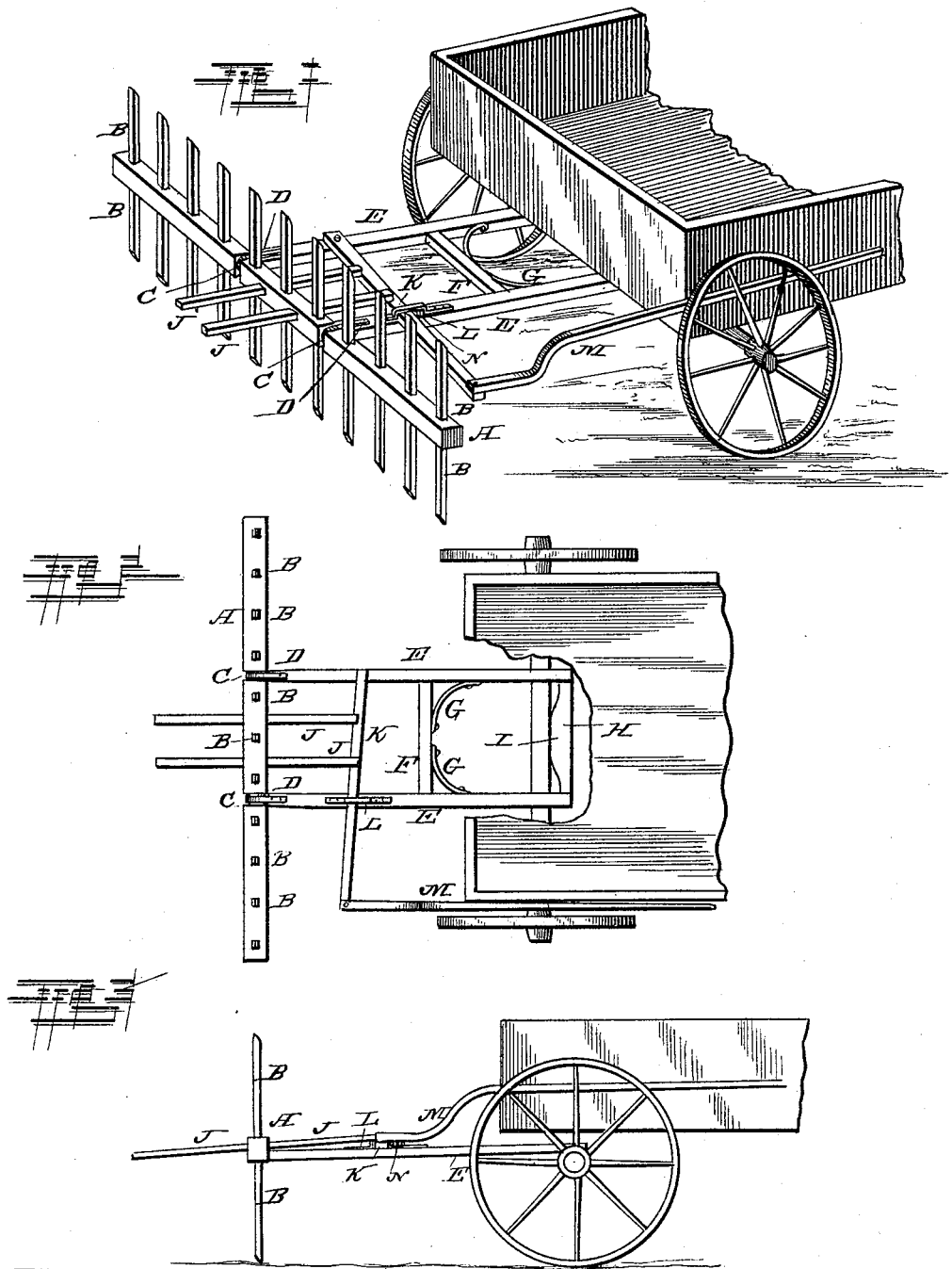

WILSON HOLLINGSWORTH AND NEWTON HOLLINGSWORTH, OF HEMLOCK, INDIANA.

STALK-RAKE.

SPECIFICATION forming part of Letters Patent No. 326,739, dated September 22, 1885.

Application filed September 12, 1884. (No model.)

*To all whom it may concern:*

Be it known that we, WILSON HOLLINGSWORTH and NEWTON HOLLINGSWORTH, both of Hemlock, in the county of Howard and State of Indiana, have invented certain new and useful Improvements in Stalk-Rakes; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved stalk-rake. Fig. 2 is a plan view showing the rake in position for operation, and Fig. 3 is a side view likewise showing the rake in position for operation.

The same letters refer to the same parts in all the figures.

This invention relates to rakes for gathering cornstalks and the like; and it has for its object to produce a device which shall possess superior advantages in point of simplicity, durability, and general efficiency.

With these ends in view the invention consists in the improved construction and arrangement of parts, which will be hereinafter fully described, and particularly pointed out in the claims.

In the drawings hereto annexed, A designates the rake-head, which consists of a beam of suitable dimensions, in which the cross-pieces B B, forming the teeth, are securely fixed. The rake-head is provided with annular grooves C C, journaled in the bands or stirrups D D upon the rear ends of the side beams, E E. The latter are connected by a cross-beam, F, and curved braces G G, and at their front ends they are furthermore connected by the cross-beam H, which is secured to the under sides of the said side beams, and the central portion of which has upon its rear side a convex or rounded portion, I, the purpose of which will be presently described. The central portion of the rake-head is provided with a pair of transverse trip-arms, J J, located between the ends of the side beams, at right angles to the rake-teeth, and somewhat exceeding the latter in length, so as to engage the trip-lever K, which is pivoted at one end to one of the side beams, and has its other end adjusted in a staple, L, upon the other beam E, and provided with a pivoted handle, M, by means of which it may be conveniently manipulated. A spring, N, may be interposed between the front end of the staple L and the end of the trip-lever, so as to force the latter in a rearward direction and into engagement with the trip-arms.

From the foregoing description, taken in connection with the drawings hereto annexed, the operation and advantages of our invention will be readily understood. The cross-beam H is hooked over the rear bolster of a wagon, and the rake is dragged over the field by the latter. The rake-teeth are retained in a nearly-vertical position by the trip-arms engaging the trip-lever, as shown, thus serving to gather the stalks, hay, or other material. When it is desired to dump the load, the trip-lever is by means of its handle drawn forward and disengaged from the trip-arms. The rake-head will then revolve in its bearings and discharge the load. The opposite ends of the trip-arms coming in contact with the trip-lever will arrest the revolution of the rake-head, and the operation will proceed as before.

Owing to the construction of the cross-beam with its rounded portion I, the draft upon the rake will always be even and direct, and corners may be turned without difficulty.

Having thus described our invention, we claim and desire to secure by Letters Patent of the United States—

1. In a revolving stalk-rake, the combination of a frame composed of suitably-connected side beams, the rake-head journaled in stirrups at the rear end of the same, and provided with the transverse teeth and trip-arms at right angles to each other, a latch or trip mechanism, and a cross-beam connecting the front ends of the frame-beams, and having a central convex or rounded portion upon its rear side, substantially as and for the purpose set forth.

2. The combination of the frame, the revolving rake-head having the teeth and trip-arms, as described, the cross-beam having a convex rounded rear portion, and the trip-lever pivoted to one of the side beams of the frame, and having a pivoted handle, a staple, and a spring, substantially as and for the purpose set forth.

In testimony that we claim the foregoing as our own we have hereunto affixed our signatures in presence of two witnesses.

WILSON HOLLINGSWORTH.
NEWTON HOLLINGSWORTH.

Witnesses:
 JOHN CLINGENPEEL,
 HUGH CHAMNESS.